(12) United States Patent
McGinty (10) Patent No.: US 11,264,943 B1
(45) Date of Patent: Mar. 1, 2022

(54) PORTABLE SUN TRACKING SYSTEM

(71) Applicant: JBC Technologies, LLC, Madison, AL (US)

(72) Inventor: Joseph Ralph McGinty, Madison, AL (US)

(73) Assignee: JBC Technologies, LLC, Madison, AL (US)

( * ) Notice: Subject to any disclaimer, the term of this patent is extended or adjusted under 35 U.S.C. 154(b) by 0 days.

(21) Appl. No.: 17/031,667

(22) Filed: Sep. 24, 2020

(51) Int. Cl.
*H02S 20/32* (2014.01)

(52) U.S. Cl.
CPC .................................. *H02S 20/32* (2014.12)

(58) Field of Classification Search
CPC ....................................................... H02S 20/32
See application file for complete search history.

(56) References Cited

U.S. PATENT DOCUMENTS

| | | | | |
|---|---|---|---|---|
| 2014/0014157 A1* | 1/2014 | Lee | ........................ | G01S 3/7861 136/246 |
| 2015/0207005 A1* | 7/2015 | Feng | ........................ | F24S 50/20 136/246 |
| 2015/0236636 A1* | 8/2015 | Sade | ........................ | H02S 30/10 136/246 |
| 2018/0332154 A1* | 11/2018 | Gharabegian | .......... | G05B 15/02 |

* cited by examiner

*Primary Examiner* — Matthew T Martin
(74) *Attorney, Agent, or Firm* — Dennen IP Law, LLC (57) ABSTRACT

A system for tracking the sun has a bottom frame and a top frame hingedly coupled at a first end to the bottom frame. Further, the system has a solar panel removably coupled to the top frame via at least one clamp on a second end of the top frame. Also, the system has a processor configured to adjust the solar panel horizontally and vertically to align with the sun for maximum efficiency.

24 Claims, 9 Drawing Sheets

PORTABLE SUN TRACKING SYSTEM

BACKGROUND

Each year hundreds of thousands of people and families travel the United States in recreation vehicles (RV). These recreational vehicles have a variety of electrical system components, which can be powered by various means. Notably, RVs use both alternating current (AC) and direct current (DC) depending upon the component being powered. Typically, a 12-Volt DC runs the electrical components of the engine and battery. The AC system runs all the appliances and power outlets found on the RV.

The RV has a battery that provides DC power to the RV. The RV provides DC power to things like a water heater, furnace, and refrigerator, most of the lights on the RV, the water pump, and other things.

The AC power system is powered by a hookup plug or a generator, and it powers daily use items. For example, the AC power system powers kitchen appliances, a television, and other large appliances.

Some RVs have solar panels. The solar panels generate DC energy and convert it to usable AC energy. The AC energy flows through the RV's electrical panel and is distributed accordingly.

BRIEF DESCRIPTION OF DRAWINGS

The system is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present disclosure is a portable sun tracking system. The portable sun tracking system comprises a frame that rests on the ground in the vicinity of recreational vehicle (RV) trailer or coach. One or more solar panels are coupled to the frame.

In operation, the portable sun tracking system automatically aligns the solar panel(s) to track the sun during the day for maximum efficiency. The portable sun tracking system is light, robust, and automatic. Further, the portable sun tracking system folds up for storage and automatically shuts down when winds or other disturbances are sensed at a camp site.

The portable sun tracking system is deployed on the ground to provide sun tracking of the solar panel(s) for maximum energy transfer to a battery or other devices. When deployed, the solar panel(s) are positioned directly toward the sun and, as the sun moves, the portable sun tracking system tracks the sun during the daylight hours to provide maximum efficiency for the immediate use of the energy or for charging of batteries for later use. The portable sun tracking system also automatically shuts down and closes during the night hours.

Figure 1:
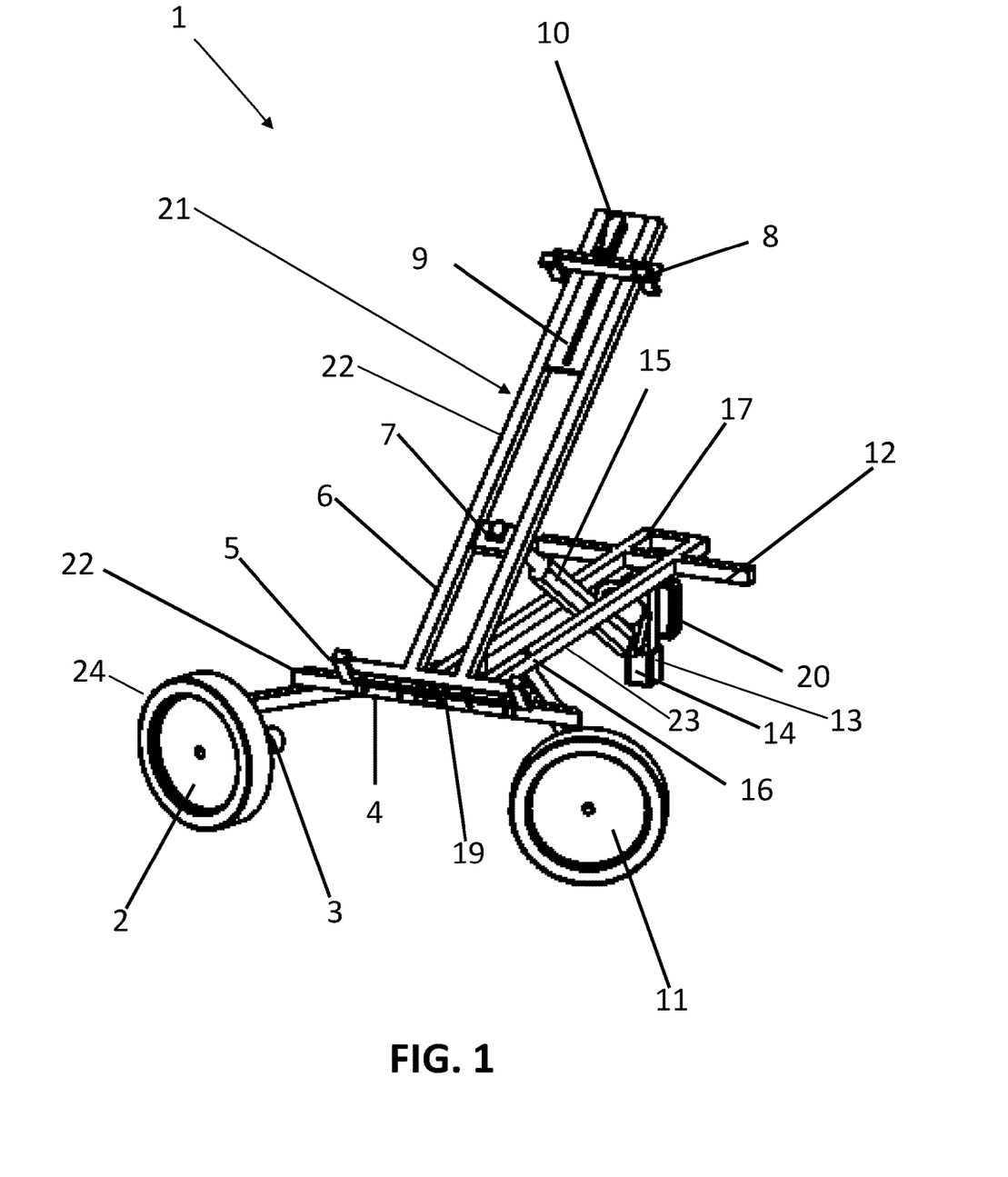
FIG. 1 is a front perspective view of a frame of a portable solar tracker in accordance with an embodiment of the present disclosure.

FIG. 1 shows the portable sun tracking system 1. The portable sun tracking system 1 comprises a frame 21. The frame of the portable sun tracking system 1 comprises an adjustable clamp 8 that slides upward and downward via the slot 9. Further, the portable sun tracking system 1 comprises an over center clamp 10. A solar panel (not shown) couples to the adjustable clamp 8 and the over center clamp 10, which is shown further in FIG. 2.

The tracking operation of the portable sun tracking system 1 is independent of the solar panel installed on the frame 21. In this regard, the frame 21 is self-contained and does not require a solar panel for tracking the sun.

The frame 21 consists of two aluminum parallel arms 6 on a top portion of the frame 21. Further, the frame 21 consists of two aluminum parallel arms 23 on the bottom frame 12. The parallel arms 6 and the parallel arms 23 are coupled via a hinge mechanism 4 to allow a top frame 22 to tilt upward with respect to the bottom frame 12. Note that the top frame 22 holds a solar panel and articulates in a vertical direction. Further note that the top frame 22 may be articulated vertically downward such that it rests on the bottom frame 12. When articulated downward and rests on bottom frame 12, the portable sun tracking system 1 is folded and is portable.

In this regard, tilting is accomplished by the activation of linear actuator 15 which can raise or lower top frame 22 as needed. The linear actuator 15 is coupled to the arms 6 of the top frame 22 via an actuator anchor 7 that provides an anchor point for the end of the Linear Actuator 15. For horizontal tracking motion, wheel 24 with gear 2 and idler wheel 11 contact the ground or reasonably flat surface, and along with foot 14 provides a triangular contact with the ground for stability. Bottom frame 12 can be driven in either in a horizontal direction by the activation of motor 3 to rotate wheel with gear 2 to move bottom frame 12 in a circular motion around the pivot point provided by foot 13 and rubber shoe 14.

Security ring 17 secures the portable sun tracking system 1 using cable locks or other security measures to prevent theft of the tracker from the remote site. It can also provide tethering to prevent the portable sun tracker from being blown over by unusually high winds.

Also attached to top frame 21 is sun tracker 19. Sun tracker 19 is a printed circuit board with an optical sun tracker (not shown), a magnetometer (not shown), and an accelerometer (not shown) mounted in a clear, water resistant case. In operation, the magnetometer measures the earth's magnetism, the accelerometer measures the position of the solar panel (not shown) and the position of the portable sun tracking system 1, and the sun tracker directs the solar panel toward the sun.

Figure 8:
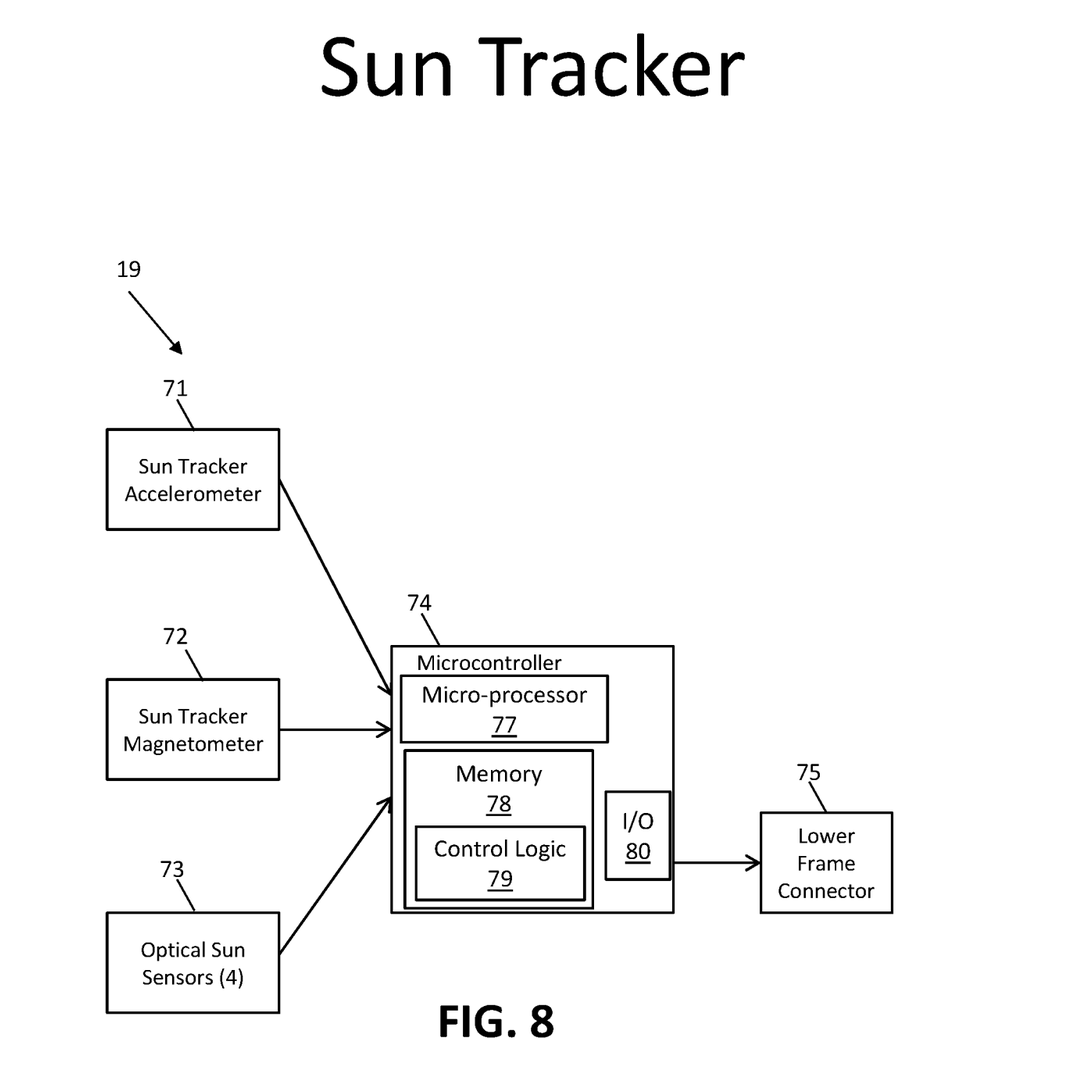
FIG. 8 is a block diagram of the sun tracker components of the frame of the portable solar tracker of FIG. 1.

As noted, the sun tracker module 19 is mounted on top frame 21 such that it follows the top frame 21 when top frame 21 is being tilted by linear actuator 15. It also follows the rotation of bottom frame 12 when bottom frame 12 is being rotated by wheel 24 with Gear 2. Note that FIG. 8 is a block diagram of the sun tracker module 19.

The sun tracker module 19 comprises at least one sensor (not shown) and there are approximate positions for mounting them. First, sun tracker module 19 is placed on top frame 21. The sun tracker accelerometer (not shown) measures the angle of gravity, giving tilt angle feedback to controller 20 as well as accelerations in all three quadrants due to wind vibration or other external disturbances. A global positioning system (GPS) (not shown) is mounted within controller 20. The GPS measures the latitude and longitude, the universal time, and many other parameters as needed. The sun tracker module comprises a magnetometer (not shown) that measures the magnetic heading of bottom frame 12 as it rotates, allowing closed loop tracking and wind vibration measurements when deployed. All sensors are connected to controller 20 using wires (not shown).

Figure 2:
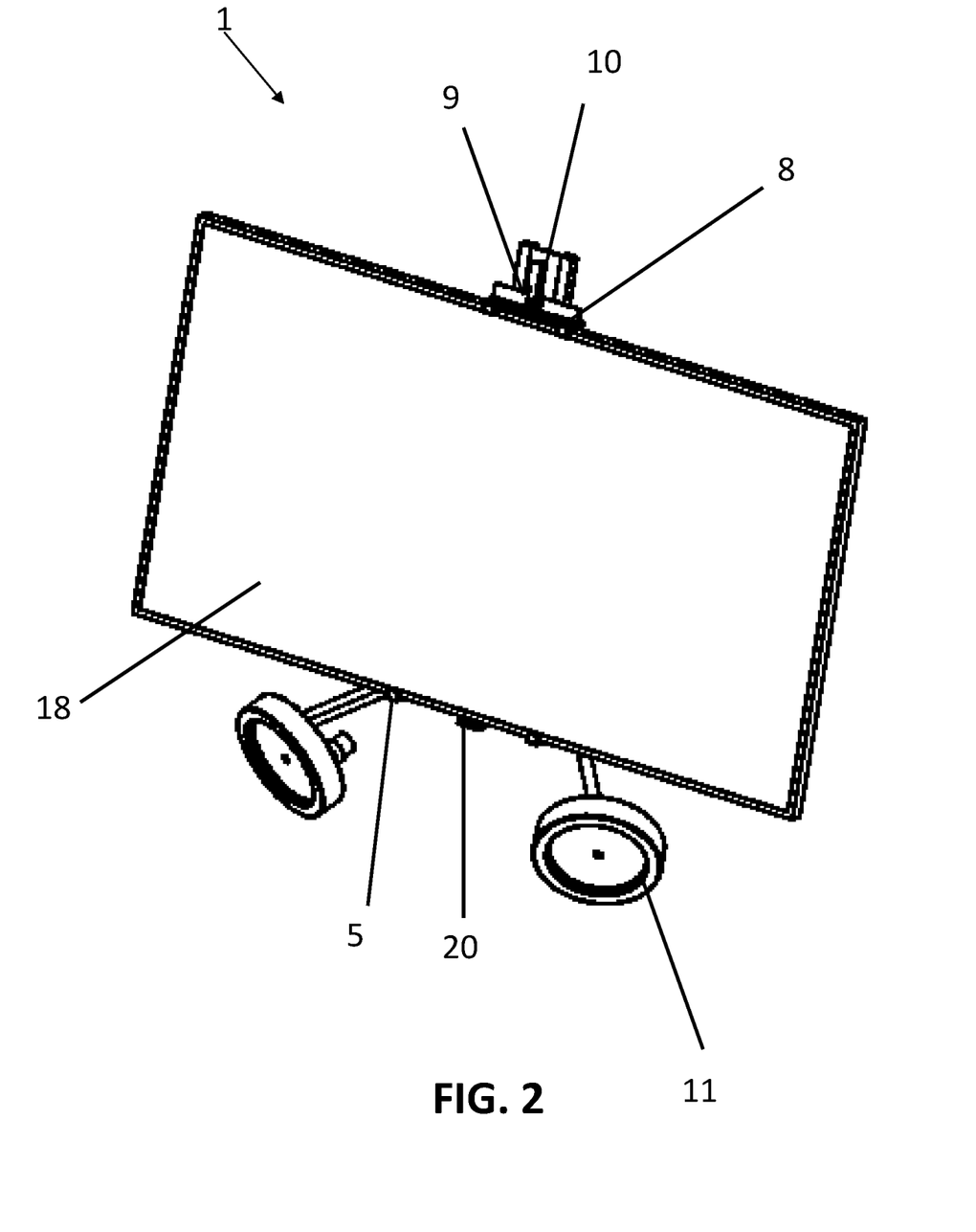
FIG. 2 is a front perspective view of the frame of the portable solar tracker of FIG. 1 having a solar panel mounted thereon.

FIG. 2 shows the portable sun tracking system having a solar panel 18 mounted thereto. The solar panel 18 mounts on top frame 22 and is secured at the bottom with an adjustable clamp 5 on both sides of the bottom of the solar panel 18. Over center clamp 10 is released and moved down to contact the top of the solar panel 18 with two adjustable clamps 8. Once in contact, over center clamp 10 is placed in a locked position to hold solar panel 18 securely during tracking operations.

Figure 3:
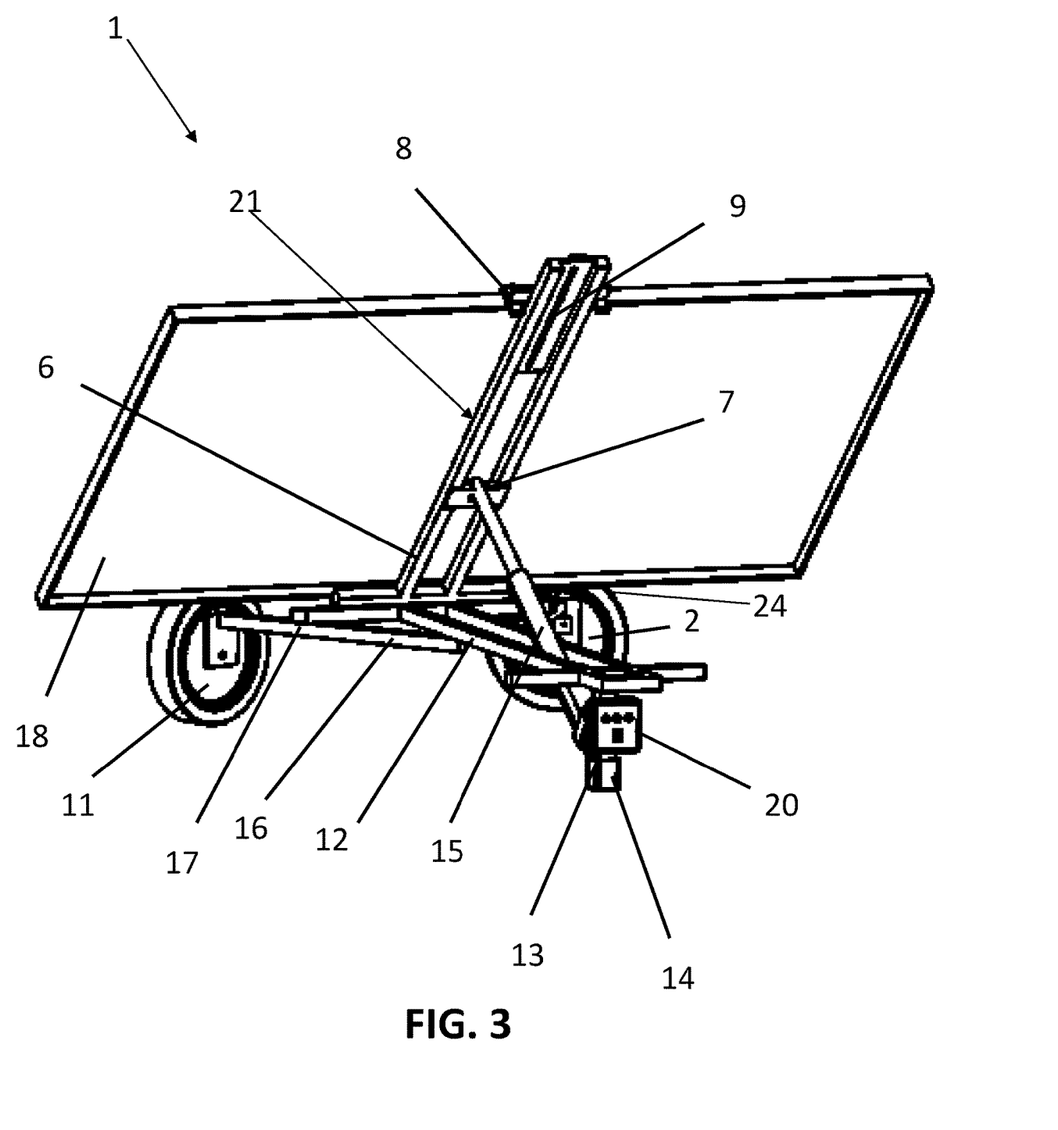
FIG. 3 is a back perspective view of the frame of the portable solar tracker of FIG. 1 having the solar panel mounted thereon.

FIG. 3 shows the rear view of the portable sun tracking system 1 after the solar panel 18 is secured and ready to track. In this regard, the solar panel 18 is mounted to the top frame 22. The solar panel 18 is secured by adjustable clamp 8, which provides a mechanism to secure the solar panel and hold it to the top of the top frame 22 on the arms 6. Further, slot 9 is the slot that allows for the adjustment of the adjustable clamp 8 to various sizes of solar panels.

Wheels 24 and 11 are coupled to the frame 21. The wheels 24 and 11 allow movement of the frame 21 in a circular fashion as the portable sun tracking system 1 follows the sun. Note that gear 2 is coupled to wheel 24, and the gear 2 comprises drive gears built in for self-propulsion.

The portable sun tracking system 1 further comprises an actuator anchor 7 that is coupled to the arms 6. The actuator anchor 7 is an anchor point for an end of the vertical linear actuator 15. Note that the vertical linear actuator may be a commercially off the shelf linear actuator that vertically lifts the top frame 21 to point the solar panel toward the sun in the vertical axis.

The bottom frame 12 is the base of the portable sun tracking system 1. The bottom frame 12 to support the sun tracking system 1. Further, bottom frame 12 coupled to the wheel 24 with gear 2 and the wheel 11.

Arm 17 is coupled to wheel 11. Arm 17 provides a locking mechanism to hold the arm 17 in the unfolded position during operations of the portable sun tracking system 1.

As indicated hereinabove, the portable sun tracking system 1 comprises a foot 13 that is a rotational anchor position for the portable sun tracking system 1 to revolve about. Further, rubber shoe 14 is a structural device to stabilize the deployed portable sun tracking system 1 on hard surfaces like concrete, for example.

Controller 20 is for controlling the operations of the portable sun tracking system 1. The controller 20 is coupled to the frame 21 of the portable sun tracking system 1. The controller 20 and operation thereof is described further herein.

Figure 4:
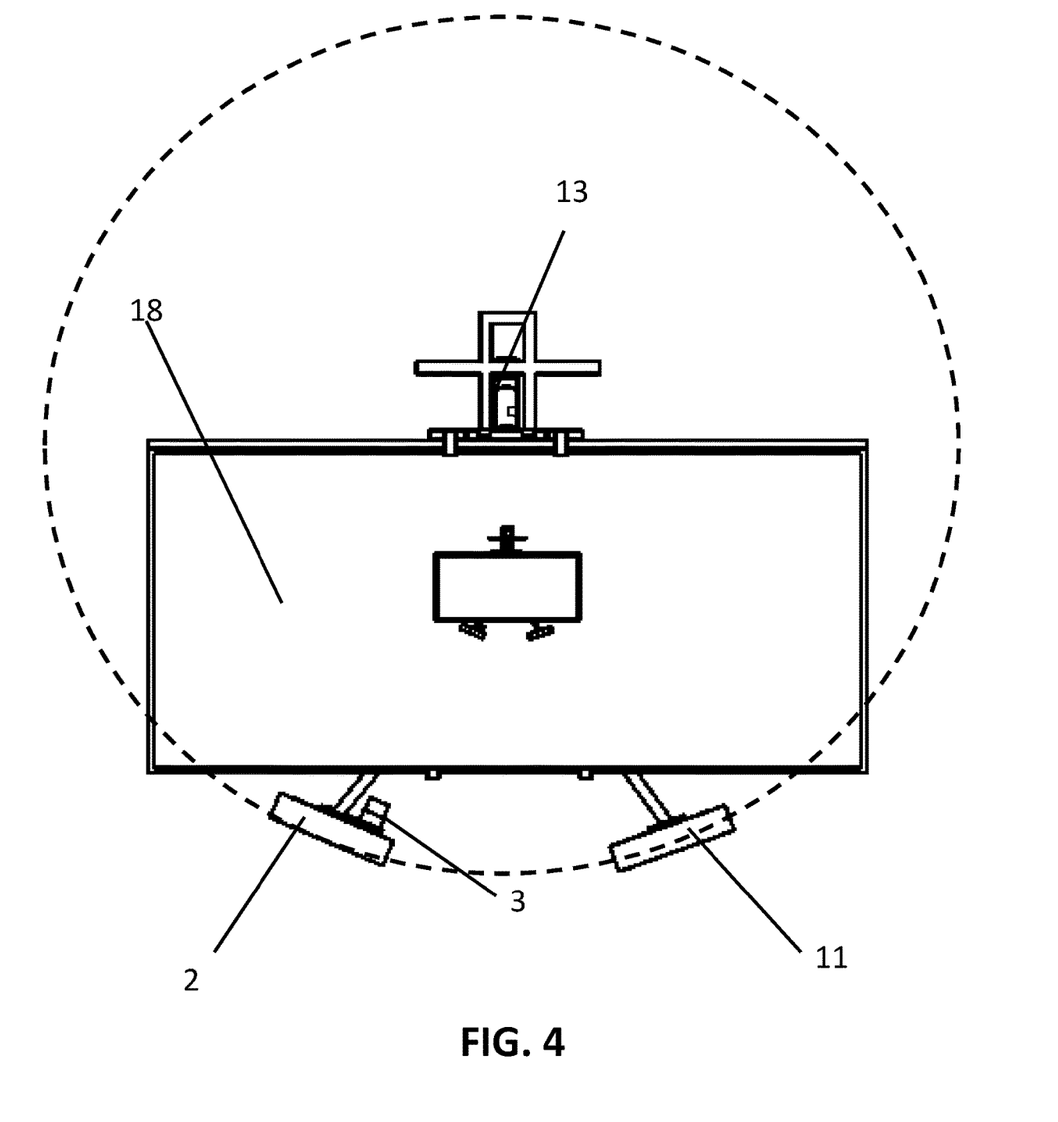
FIG. 4 is a front plan view of the frame of the portable solar tracker of FIG. 1 having the solar panel mounted thereon and indicating motion of the solar panel.

FIG. 4 illustrates horizontal tracking motion of the portable sun tracking system 1. In this regard, wheel 24 with gear 2 and idler wheel 11 contact the ground or reasonably flat surface, and along with Foot 13 provides a triangular contact with the ground for stability.

Bottom Frame 12 can be driven in either horizontal direction by the activation of motor 3 to rotate wheel 24 with Gear 2 to move frame 21 in a circular motion around the pivot point provided by foot 13 and rubber shoe 14. Security Ring 17 allows the user to secure the portable sun tracking system 1 using cable locks or other security measures to prevent theft of the tracker from the remote site. It can also provide tethering to prevent the solar tracker from being blown over by unusually high winds.

Figure 5:
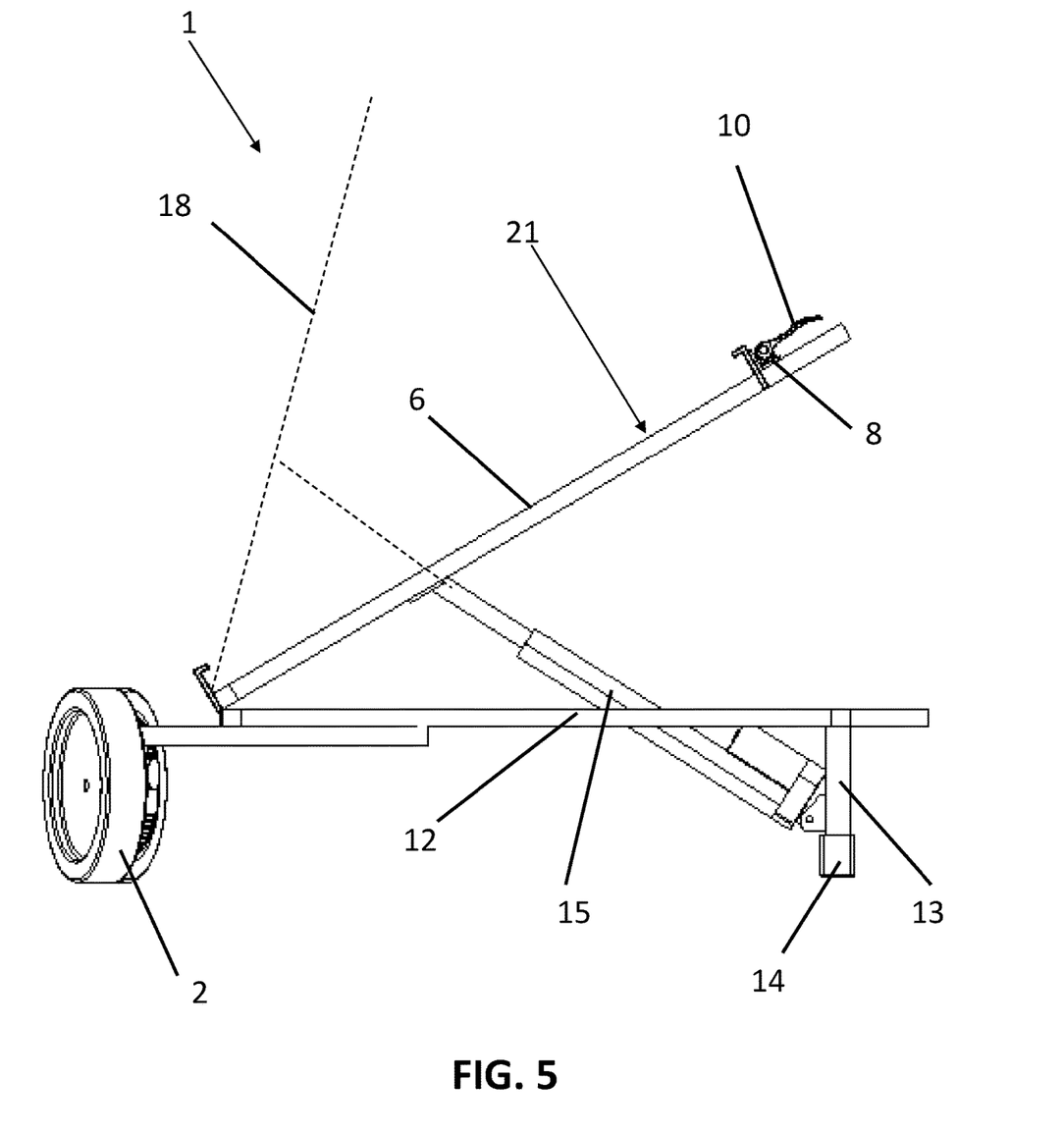
FIG. 5 is a side plan view of the frame of the portable solar tracker of FIG. 1 showing vertical motion and maximum elevation of the frame.

FIG. 5 is a side view of the upper frame 21 comprising arms 6, tilted by linear actuator 15. The maximum tilt angle may be 75 degrees for tracking the sun just above the horizon. Further, bottom frame 12 is hingedly coupled to the top frame 21 so that the linear actuator 15 can move the top frame 21 in a vertical direction.

Further, foot 13 having rubber foot 14 is attached to the bottom frame 12. The foot 13 provides a rotation anchor for the portable sun tracking system to revolve about, and the rubber foot 14 stabilizes the portable sun tracking system 1 on hard surfaces like concrete. Wheel 2 is shown, which effectuates movement of the portable sun tracking system 1 along a circular track about the foot 13.

Adjustable clamp 8 secures the solar panel 18 (FIG. 2) to the top frame 21. Further, over center clamp 10 allows the user to adjust adjustable clamp 8 in slot 9 (FIG. 2) to conform to various solar panel sizes.

Figure 6:
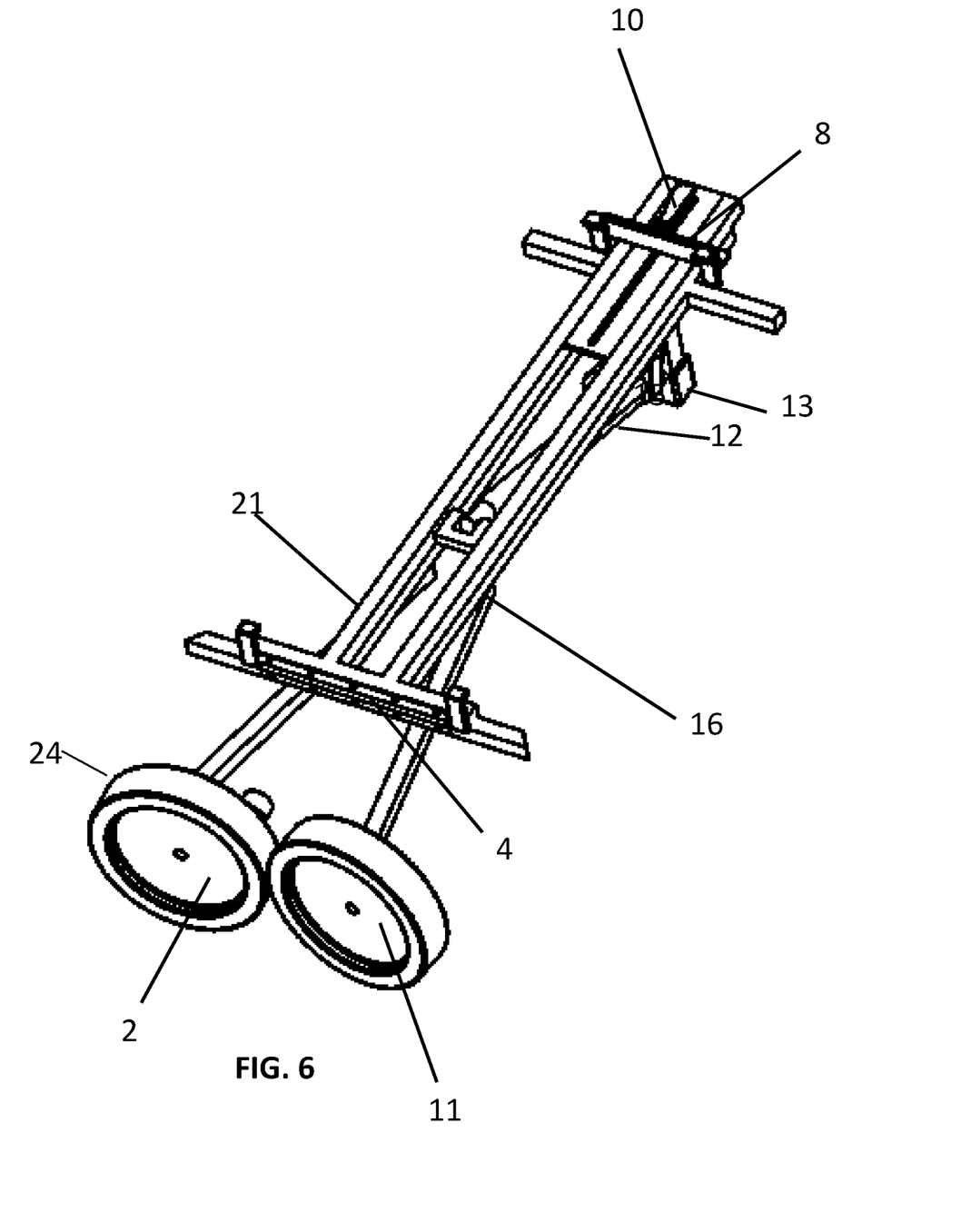
FIG. 6 is a front perspective view of the frame of the portable solar tracker of FIG. 1 in folded for storage.

FIG. 6 shows the portable tracking system 1 in the folded position. The folded position allows the user to store the portable sun tracking system 1. Wheel 24 with gear 2 and idler wheel 11 fold to the center to minimize the width for storage. This is accomplished via a folding pivot 16 that is a mechanism to allow the wheel 24 with gear 2 and idler wheel 11 to be rotated inward for folding. Upper clamps 8 and 10 can also be aligned for minimum width for storage. The top frame 21 folds down upon the bottom frame 12 via the linear actuator 15. The entire unit can then be encased is a soft bag or case (not shown) for storage.

Figure 7:
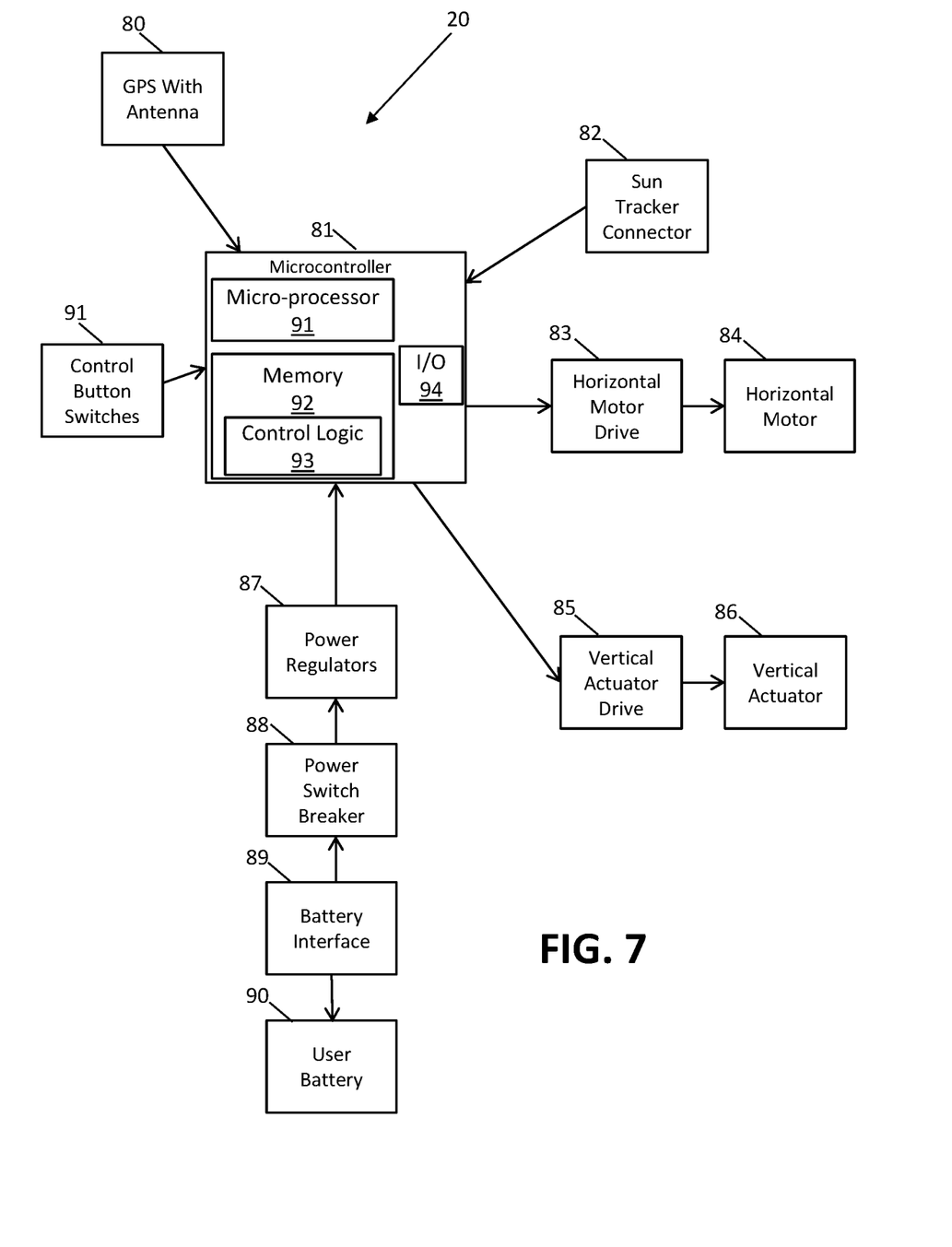
FIG. 7 is a block diagram of a main controller for the frame of the portable solar tracker of FIG. 1.

FIG. 7 is a block diagram of a control system 20 for controlling the portable sun tracking system 1 (FIG. 2). The control system 20 comprises a microcontroller 81, which comprises a microprocessor 91, and input/output ports 94. The microcontroller 81 further comprises memory 92.

Stored in memory 92 is control logic 93. The control logic 93 may be hardware, software, firmware, or any combination thereof. The microprocessor 91 controls elements within the control system 20 via a local interface (not shown), which can include at least one bus. Further, the microprocessor 91 is configured to execute instructions of software, such as the control logic 93.

The control system 20 further comprises a global positioning system with an antenna 80, a un tracker connector, a horizontal motor drive 83 that controls a horizontal motor 84, and a vertical actuator drive 85 that controls a vertical actuator 86. Also, the control system 20 further comprises control button switches 91, power regulators 87, a power switch breaker 88, a battery interface 89, and a user battery 90.

The control logic 93 controls operation of the portable sun tracking system 1. In this regard, the control logic 93 receives inputs relative to a position of the sun in the sky. Based upon the position of the sun in the sky, the control logic 93 activates the horizontal motor drive 83 and the vertical actuator drive 85 to position the solar panel 18 for maximum efficiency.

Note that the control system 20 is an electronic printed circuit board within a weather tight case that houses all of the main controller electronics and external interfaces to the horizontal motor drive 83, the vertical actuator drive 85, the sun tracker 19, and to the user battery 90.

Note that the block diagram of control system 20 is mounted on bottom frame 12, as described above. The GPS 80, the sun tracker 82, and the control button switches 91 are all inputs to Microcontroller 81. These measurements are all processed and calibrated by the control logic 93.

GPS 80 provides standard NMEA sentences including latitude, longitude, universal time and many other parameters. This information is useful to assist in sun tracking depending upon the position of the tracker, sky conditions, and the time of day.

After processing the input data and reading the GPS data, the control logic 93 transmits commands to the horizontal motor 84 via the horizontal motor drive 83 and the vertical actuator 86 via vertical actuator drive 85. This configuration results in a closed loop system. That is, the tilt angle and heading are known and monitored by Microcontroller 81 during operation to control the portable sun tracking system 1.

User Battery 90, controlled by main power Switch Breaker 88 via the battery interface 89, provides the power used by the electronics and actuators. Block 87 regulates the power for the electrical requirements of microcontroller 81.

FIG. 8 is a block diagram of the sun tracker module 19 (FIG. 1) that is coupled to microcontroller 91 via the sun tracker connection 82 (FIG. 7). The sun tracker module 19 comprises the sun tracker accelerometer 71, which is an electronic accelerometer that measures the position of gravity, thus deriving the elevation angle of top frame 21 continuously.

The sun tracker module 19 further comprises a sun tracker magnetometer 72, which measures the magnetic compass heading of top frame 21 continuously. Also, the sun tracker module 19 comprises an array of four optical sun sensors 73 mounted within a shaded cross arrangement that measures the intensity of the sun of each sensor (not shown). As a sensor is shaded by the off-angle of the sun, the relative sun intensity readings are used to adjust the portable sun tracker system so that the solar panel 18 (FIG. 2) tracks the sun directly.

Microcontroller 74 controls the three elements, and when requested from the control logic 93 (FIG. 7), sends the compass heading, elevation, and four sun intensities via lower frame connector 75 to the control system 20.

Figure 9:
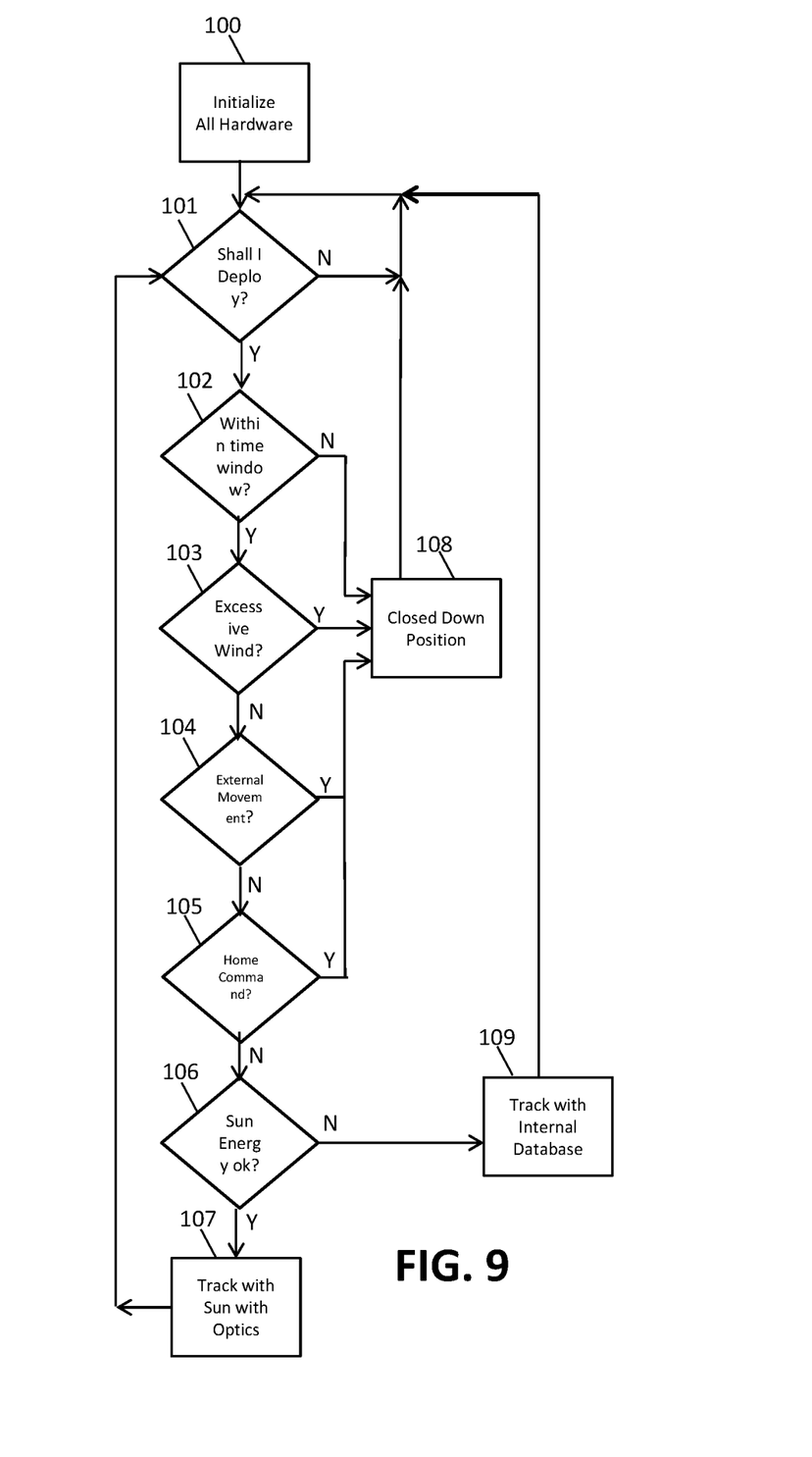
FIG. 9 is a flowchart depicting exemplary architecture and functionality of the portable solar tracker of FIG. 1.

FIG. 9 is a flowchart depicting exemplary architecture and functionality of the control logic 93 (FIG. 7). In step 100, the control logic 93 initializes the hardware in the portable sun tracking system 1 when the portable sun tracking system 1 is powered on. The control logic 93 waits until a user (not shown) pushes a deploy pushbutton on controller 20, and when pushed, the control logic 93 deploys the portable sun tracking system 1 in step 101.

When deployed, the control logic 93 processes the data from optical sun sensors 73 (FIG. 8). Upon processing the sensor data, the control logic 93 controls the horizontal motor drive 83 and the vertical actuator drive 85 so that the solar panel 18 (FIG. 2) tracks the sun for the entire day until the maximum time is reached in step 102. If excessive winds are detected in step 103, external movement is detected in step 104, or the user commands it to return to the retracted or closed down home position in step 105, the control logic 93 closes down the portable sun tracking system 1 to its closed position in step 108.

The sun's present energy is measured by the optical sensors by sun tracker 19. If the sun energy is enough to track the sun optically in block 106, the control logic 93 will track the sun using real time data from the optical sun sensors 73 in sun tracker 19.

If there is not enough sun energy to track, i.e. cloudy conditions, in step 106, then the control logic 93 will track the sun position from an internal database in the microcontroller 81 in controller 20 in step 109. The internal database compensates for position, month, and time of day of the portable sun tracking system 1, including earth position, until the sun's energy returns, or the time of day reaches the maximum time in step 102. The database contains the sun's elevation angle and horizontal heading for given months, time, and location on the earth. If the control logic 93 returns the unit to the closed position, it will remain there until the user reactivates it in step 101.

If there is enough sun energy to track the sun, the control logic 93 tracks the sun with the optical sun sensors 73.

Thus, as described, frame 21 with Solar Panel 18 temporarily attached can be tilted from approximately 0 to 75 degrees in the vertical direction and rotated greater than +/−360 degrees in the horizontal direction, depending only on the limitations of the wiring harness. This operation allows the portable sun tracking system 1 to completely track the sun in the daylight hours anywhere in the sky.

While the disclosure has been disclosed in preferred form, it will be apparent to those skilled in the art that many modifications, additions, and deletions can be made therein without departing from the spirit and scope of the disclosure.

What I claim is:

1. A system for tracking the sun, comprising:
   a bottom frame comprising only two wheels, each wheel on a front side of the bottom frame, the bottom frame further comprising an anchor on a back side of the bottom frame that is centered between and behind the two wheels;
   a top frame hingedly coupled at a first end to the bottom frame and the top frame is coupled to the bottom frame via only one linear actuator;
   a solar panel removably coupled to the top frame, the solar panel coupled to the top frame via at least one clamp on a second end of the top frame; and
   a processor configured to adjust the solar panel horizontally and vertically to align with the sun for maximum efficiency.

2. The system for tracking the sun of claim 1, wherein on a first end of the linear actuator, the linear actuator is coupled to a foot that is coupled to the bottom frame.

3. The system for tracking the sun of claim 2, wherein on a second end of the linear actuator, the linear actuator is coupled to an actuator anchor that is movably coupled to the top frame so that the processor may control the linear actuator to move the solar panel vertically.

4. The system for tracking the sun of claim 1, further comprising a first wheel coupled to a first side of the bottom frame and a second wheel coupled to a second side of the bottom frame.

5. The system for tracking the sun of claim 4, wherein the second wheel comprises a gear that is controlled by a motor coupled to the gear.

6. The system for tracking the sun of claim 5, wherein the processor is configured for activating the motor coupled to the gear to move the solar panel horizontally.

7. The system for tracking the sun of claim 1, further comprising adjustable clamps on a bottom of the top frame, the adjustable clamps configured for grasping the solar panel at the bottom of the top frame.

8. The system for tracking the sun of claim 1, further comprising a sun tracker device.

9. The system for tracking the sun of claim 8, wherein the sun tracker device is a printed circuit board.

10. The system for tracking the sun of claim 9, wherein the sun tracker device comprises an optical sun tracker.

11. The system for tracking the sun of claim 10, wherein the optical sun tracker comprises four optical sun sensors mounted within a shaded cross arrangement.

12. The system for tracking the sun of claim 11, wherein optical devices measure the intensity of the sun from each sensor.

13. The system for tracking the sun of claim 12, wherein when one of the sensors is shaded by an off-angle of the sun, the relative sun intensity readings are transmitted to the processor.

14. The system for tracking the sun of claim 13, wherein the processor adjusts the sun tracker device vertically and/or horizontally so that the solar panel tracks the sun directly.

15. The system for tracking the sun of claim 9, wherein the sun tracker device further comprises a magnetometer.

16. The system for tracking the sun of claim 15, wherein the magnetometer measures a magnetic compass heading of the top frame continuously and transmits data indicative of the compass heading to the processor.

17. The system for tracking the sun of claim 16, wherein the processor is configured to control the position of the solar panel based upon the data indicative of the compass heading.

18. The system for tracking the sun of claim 9, further comprising an accelerometer.

19. The system for tracking the sun of claim 18, wherein the accelerometer measures the position of the solar panel and transmits data indicative of the position of the solar panel to the processor.

20. The system for tracking the sun of claim 19, wherein the processor is configured to adjust the solar panel based upon the data indicative of the position of the solar panel.

21. The system for tracking the sun of claim 1, wherein the top frame is collapsible such that when it is collapsed is rests parallel and on top of the bottom frame.

22. The system for tracking the sun of claim 1, wherein the two wheels are configured to retract such that the wheels are side-by-side.

23. The system for tracking the sun of claim 1, wherein the processor is not configured to calculate in power conditioning.

24. The system for tracking the sun of claim 1, wherein the processor is configured to track the sun based upon position, month, and time of day contained in an internal database when solar data is unavailable.

\* \* \* \* \*